United States Patent
Soo et al.

(10) Patent No.: US 8,971,505 B2
(45) Date of Patent: *Mar. 3, 2015

(54) METHOD AND APPARATUS FOR PROVIDING A CUSTOMER PREMISE BASED COMMUNICATION SYSTEM

(71) Applicant: AT&T Intellectual Property I, L.P., Atlanta, GA (US)

(72) Inventors: Armstrong Soo, San Ramon, CA (US); Bernard Ku, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 144 days.

This patent is subject to a terminal disclaimer.

(21) Appl. No.: 13/686,702

(22) Filed: Nov. 27, 2012

(65) Prior Publication Data

US 2013/0083913 A1 Apr. 4, 2013

Related U.S. Application Data (63) Continuation of application No. 12/424,017, filed on Apr. 15, 2009, now Pat. No. 8,358,757.

(51) Int. Cl.
| | |
|---|---|
| *H04M 3/54* | (2006.01) |
| *H04W 4/02* | (2009.01) |
| *H04L 29/06* | (2006.01) |
| *H04L 29/08* | (2006.01) |
| *H04M 3/428* | (2006.01) |
| *H04M 3/56* | (2006.01) |

(52) U.S. Cl.
CPC *H04M 3/54* (2013.01); *H04W 4/02* (2013.01); *H04L 65/1016* (2013.01); *H04L 65/1069* (2013.01); *H04L 65/1083* (2013.01); *H04L 65/1096* (2013.01); *H04L 67/18* (2013.01); *H04M 3/4288* (2013.01); *H04M 3/56* (2013.01)
USPC ............. 379/93.01; 379/201.12; 379/211.02; 379/90.01

(58) Field of Classification Search
CPC ....... H04M 3/54; H04M 3/4288; H04M 3/56; H04L 67/18; H04L 65/1069; H04L 65/1083; H04L 65/1096; H04L 65/1016; H04W 4/02
USPC ............. 379/93.01, 90.01, 211.02, 201, 102, 379/110, 88.19, 207.15
See application file for complete search history.

(56) References Cited

U.S. PATENT DOCUMENTS

| | | | |
|---|---|---|---|
| 6,069,873 A | 5/2000 | Pugaczewski et al. | |
| 8,358,757 B2 | 1/2013 | Soo et al. | |
| 2004/0047339 A1* | 3/2004 | Wang et al. | 370/352 |
| 2004/0264444 A1* | 12/2004 | Kaplan et al. | 370/352 |
| 2005/0074111 A1* | 4/2005 | Hanson et al. | 379/212.01 |
| 2005/0180393 A1 | 8/2005 | Skubisz | |
| 2006/0203986 A1 | 9/2006 | Gibson | |
| 2008/0212744 A1* | 9/2008 | Wurst et al. | 379/27.01 |
| 2009/0323558 A1 | 12/2009 | Meenavalli | |

* cited by examiner

*Primary Examiner* — Melur Ramakrishnaiah (57) ABSTRACT

A method and an apparatus for providing a customer premise based feature. For example, the method receives a call directed to a customer, wherein the call is associated with a customer premise based feature. The method then forwards the call to a customer premise based communication system located at a location of the customer, wherein the customer premise based feature is implemented locally by the customer premise based communication system.

18 Claims, 5 Drawing Sheets

METHOD AND APPARATUS FOR PROVIDING A CUSTOMER PREMISE BASED COMMUNICATION SYSTEM

This application is a continuation of U.S. patent application Ser. No. 12/424,017, filed Apr. 15, 2009, now U.S. Pat. No. 8,358,757, and is herein incorporated by reference in its entirety.

The present invention relates generally to communication networks and, more particularly, to a method and apparatus for providing a customer premise based communication system for controlling and customizing service features for a phone, e.g., a Voice over Internet Protocol (VoIP) phone, and the like.

BACKGROUND OF THE INVENTION

A network service provider may enable customers to access and use various call features. For example, a network service provider, e.g., a Voice over Internet Protocol (VoIP) service provider, may enable customers to access features such as call waiting, call forwarding, three-way calling, etc.

The service provider may store the features that are available for a phone number in a service profile. When a customer accesses the service, the features stored in the service profile may then be applied. Hence, in order to service a customer, the service provider needs to provide a desirable list of features. Unfortunately, developing and introducing features require a tremendous amount of resources. For example, in order to introduce a new feature, the service provider may need to dedicate various resources for identifying a feature that may be appropriate for large-scale deployment, for procuring application and/or feature servers, for developing the application and/or feature, for testing the new feature from both technical and marketing perspectives, and so on. Hence, the features that are available from service providers tend to be basic, inflexible, and seldom modified.

SUMMARY OF THE INVENTION

In one embodiment, the present invention discloses a method and an apparatus for providing a customer premise based feature. For example, the method receives a call directed to a customer, wherein the call is associated with a customer premise based feature. The method then forwards the call to a customer premise based communication system located at a location of the customer, wherein the customer premise based feature is implemented locally by the customer premise based communication system.

In another embodiment, the method receives a call directed to a customer or a call from the customer, wherein the call is associated with a customer premise based feature, wherein the call is received by a customer premise based communication system located at a location of the customer. The method then implements the customer premise based feature locally by the customer premise based communication system.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for providing a customer premise based communication system for controlling and customizing service features for a phone, e.g., a Voice over Internet Protocol (VoIP) phone, and the like. Although the present invention is discussed below in the context of Internet Protocol (IP) Multimedia Subsystem (IMS) networks, the present invention is not so limited. Namely, the present invention can be applied to packet networks in general, e.g., Voice over Internet Protocol (VoIP) networks, Service over Internet Protocol (SoIP) networks, and the like.

Figure 1:
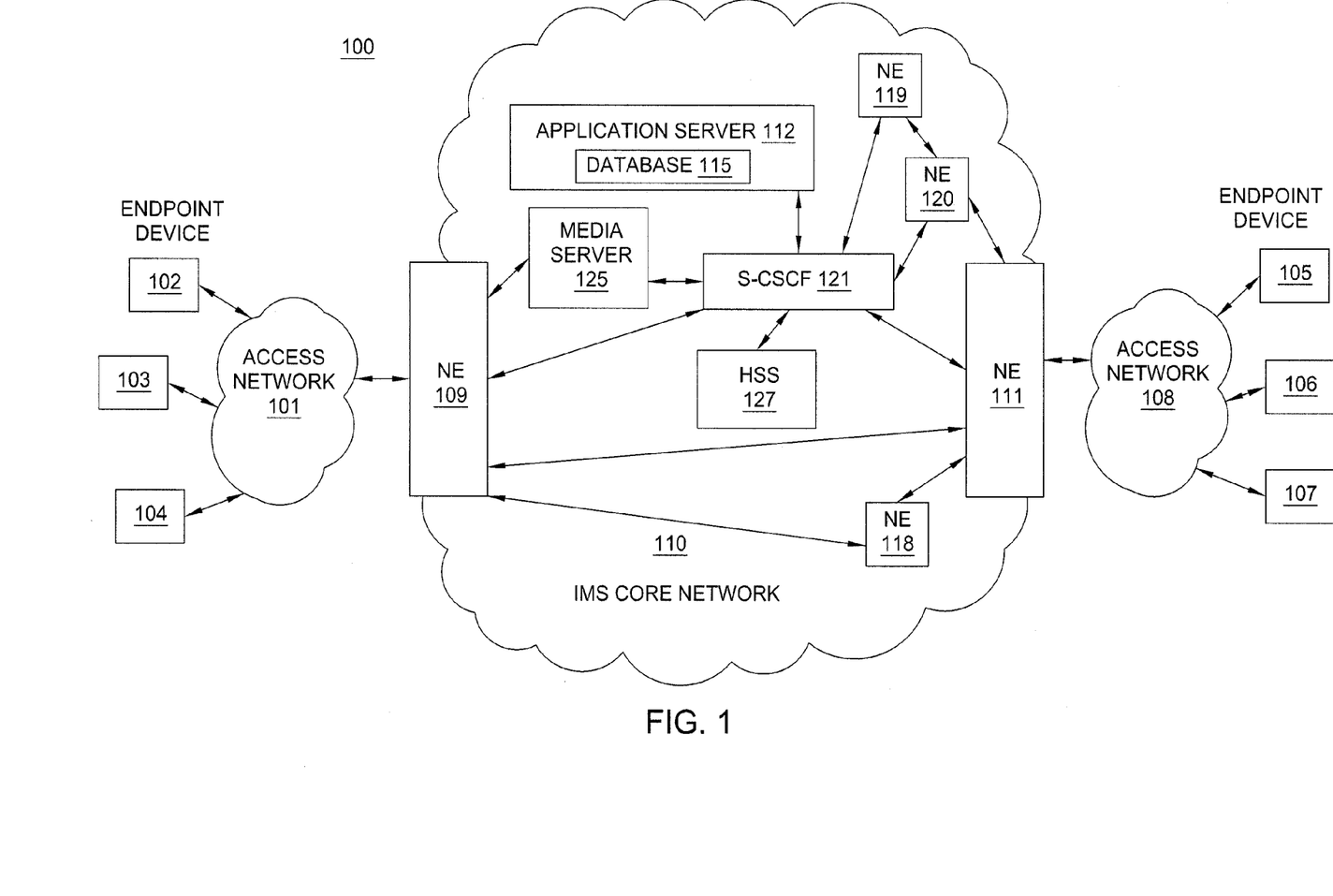
FIG. 1 illustrates an exemplary network related to the present invention.

To better understand the present invention, FIG. 1 illustrates an example network 100, e.g., an Internet Protocol (IP) Multimedia Subsystem network related to the present invention. An IP network is broadly defined as a network that uses Internet Protocol to exchange data packets. Exemplary IP Multimedia Subsystem (IMS) networks include Internet protocol (IP) networks such as Voice over Internet Protocol (VoIP) networks, Service over Internet Protocol (SoIP) networks, and the like.

In one embodiment, the network 100 may comprise a plurality of endpoint devices 102-104 configured for communication with the core IMS network 110 (e.g., an IP based core backbone network supported by a service provider) via an access network 101. Similarly, a plurality of endpoint devices 105-107 are configured for communication with the IMS core packet network 110 via an access network 108. The network elements 109 and 111 may serve as gateway servers or edge routers for the network 110.

The endpoint devices 102-107 may comprise customer endpoint devices such as personal computers, laptop computers, Personal Digital Assistants (PDAs), and the like. The access networks 101 and 108 serve as a means to establish a connection between the endpoint devices 102-107 and the Network Elements (NEs) 109 and 111 of the IMS core network 110. The access networks 101 and 108 may each comprise a Digital Subscriber Line (DSL) network, a broadband cable access network, a Local Area Network (LAN), a Wireless Access Network (WAN), a $3^{rd}$ party network, and the like. The access networks 101 and 108 may be either directly connected to NEs 109 and 111 of the IMS core network 110, or indirectly through another network.

Some NEs (e.g., NEs 109 and 111) reside at the edge of the IMS core infrastructure and interface with customer endpoints over various types of access networks. An NE that resides at the edge of a core infrastructure is typically implemented as an edge router, a media gateway, a proxy server, a border element, a firewall, a switch, and the like. An NE may also reside within the network (e.g., NEs 118-120) and may be used as a SIP server, a core router, or like device.

The IMS core network 110 also comprises a Home Subscriber Server (HSS) 127, a Serving-Call Session Control Function (S-CSCF) 121, a Media Server (MS) 125, and an Application Server 112 that contains a database 115. An HSS 127 refers to a network element residing in the control plane of the IMS network that acts as a central repository of all customer specific authorizations, service profiles, preferences, etc.

The S-CSCF 121 resides within the IMS core infrastructure and is connected to various network elements (e.g., NEs 109 and 111) using the Session Initiation Protocol (SIP) over the underlying IMS based core backbone network 110. The S-CSCF 121 may be implemented to register users and to provide various services (e.g. VoIP services). The S-CSCF interacts with the appropriate VoIP/SoIP service related applications servers (e.g., 112) when necessary. The S-CSCF 121 performs routing and maintains session timers. The S-CSCF may also interrogate an HSS to retrieve authorization, service information, user profiles, etc. In order to complete a call that requires certain service specific features, the S-CSCF may need to interact with various application servers (e.g. various VoIP servers). For example, the S-CSCF may need to interact with another server for translation of an E.164 voice network address into an IP address, and so on.

The Media Server (MS) 125 is a special server that typically handles and terminates media streams to provide services such as announcements, bridges, and Interactive Voice Response (IVR) messages for VoIP service applications. The media server also interacts with customers for media session management to accomplish tasks such as process requests.

The application server 112 may comprise any server or computer that is well known in the art, and the database 115 may be any type of electronic collection of data that is also well known in the art. Those skilled in the art will realize that the communication system 100 may be expanded by including additional endpoint devices, access networks, network elements, application servers, etc. without altering the scope of the present invention.

The above IP network is described to provide an illustrative environment in which packets for voice and data services are transmitted on IP Multimedia Subsystem (IMS) networks. A network service provider may enable customers to access and use various call features. For example, a network service provider may enable customers to access call features such as call waiting, call forwarding, three-way calling, etc. The service provider may store the features that are available for a phone number in a service profile. For example, if a customer subscribes to a call waiting feature and a call forwarding feature, the service provider may store the selected (call waiting and call forwarding) features in a server used for storing customer service profiles. When a customer initiates or receives a call, the features in the service profile may then be applied.

In order to service a customer and successfully sell the features to customers, the service provider may then need to provide a desirable list of features. Unfortunately, developing and introducing features require a tremendous amount of resources, such as resources for identifying desirable features, resources for procuring application and/or feature servers, resources for developing the application and/or feature, resources for testing the new features, and so on. Hence, the features that are available from service providers tend to be basic, inflexible, and seldom modified.

Customers may wish to have features that are not available through their service provider. For example, a feature may be available from a VoIP service provider, while it is not available from the customer's DSL service provider and so on.

In one embodiment, the current method provides a customer premise based communication system for controlling and customizing service features for a phone, e.g., a Voice over Internet Protocol (VoIP) phone, and the like. For example, the method first provides the customer with a VoIP Central System (VCS). In one embodiment, the VCS refers to a system that comprises a SIP server, an application server for service creation, e.g. a Service Creation Environment (SCE) server, and a web server. The VCS may be implemented in a network device, a module in a network device, or in a plurality of interconnected network devices or modules. The VCS may also comprise one or more of a firewall, a router or a switch. In one embodiment, the VCS may also further comprise one or more interfaces for interfacing with the service provider. For example, the customer may communicate with the service provider via a particular interface and activate, deactivate and/or modify features provided by the service provider. For example, the customer may modify selections within features, select new features, and so on.

In one embodiment, the VCS may be a software module that is implemented in a general-purpose computing platform. For example, the VCS functions may be implemented in a computer, a gateway router, etc. In one embodiment, the VCS interface to the service provider may be web based. For example, the customer may be accessing a menu of features located in the service provider's network via the Internet. In one embodiment, the VCS may include a Graphical User Interface (GUI) for designing and/or modifying features. For example, the GUI may be used by a customer to select whether calls are to be forwarded to a voice mailbox, a mobile phone, and so on.

In one embodiment, the SIP server may be used for triggering outbound SIP messages and processing of inbound SIP messages. For example, the SIP server may be used for initiating SIP INVITE messages or receiving SIP INVITE messages. The web server may be used to create Hyper-Text Markup Language (HTML) pages and also to provide GUI functions at a presentation layer.

In one embodiment, the SCE server may be used for creating and/or modifying features. For example, a customer may wish to build a new (unique) set of features. For example, a customer may wish to program or customize a VoIP feature that forwards calls to a first number of the customer to a mobile phone for screening prior to allowing the caller to leave a message. The feature may enable the VCS to receive a call (e.g., at a customer's home number) and forward the call to the customer's mobile phone before allowing the call to proceed to the customer's voice mailbox. The customer may then indicate to the VCS whether the call should be forwarded to the voice mailbox or discarded. For example, the customer may enter a code via the mobile phone that indicates that the call is to be forwarded to a voice mailbox. In another example, the customer may enter a code via the mobile phone indicating to transfer the call to the mobile phone, so that the customer can answer the call immediately via the mobile phone. In yet another example, the customer may provide a code via the mobile phone that indicates to the VCS to let the phone continue ringing without forwarding the call to the voice mailbox or to discard the call.

In one embodiment, the SCE server may enable a customer to control one or more parameters for customizing an existing feature. For example, a customer may be able to change the values of one or more parameters to fine-tune (tweak) features to match a desired behavior. For example, a call forwarding feature that forwards calls after four rings may be available from the service provider. The customer may prefer delaying the call forwarding such that calls are forwarded to a mailbox only after more than four rings, e.g., ten rings and so on. The customer may then be able to change a parameter for the call forwarding feature downloaded from the service provider to achieve the desired behavior.

Figure 2:
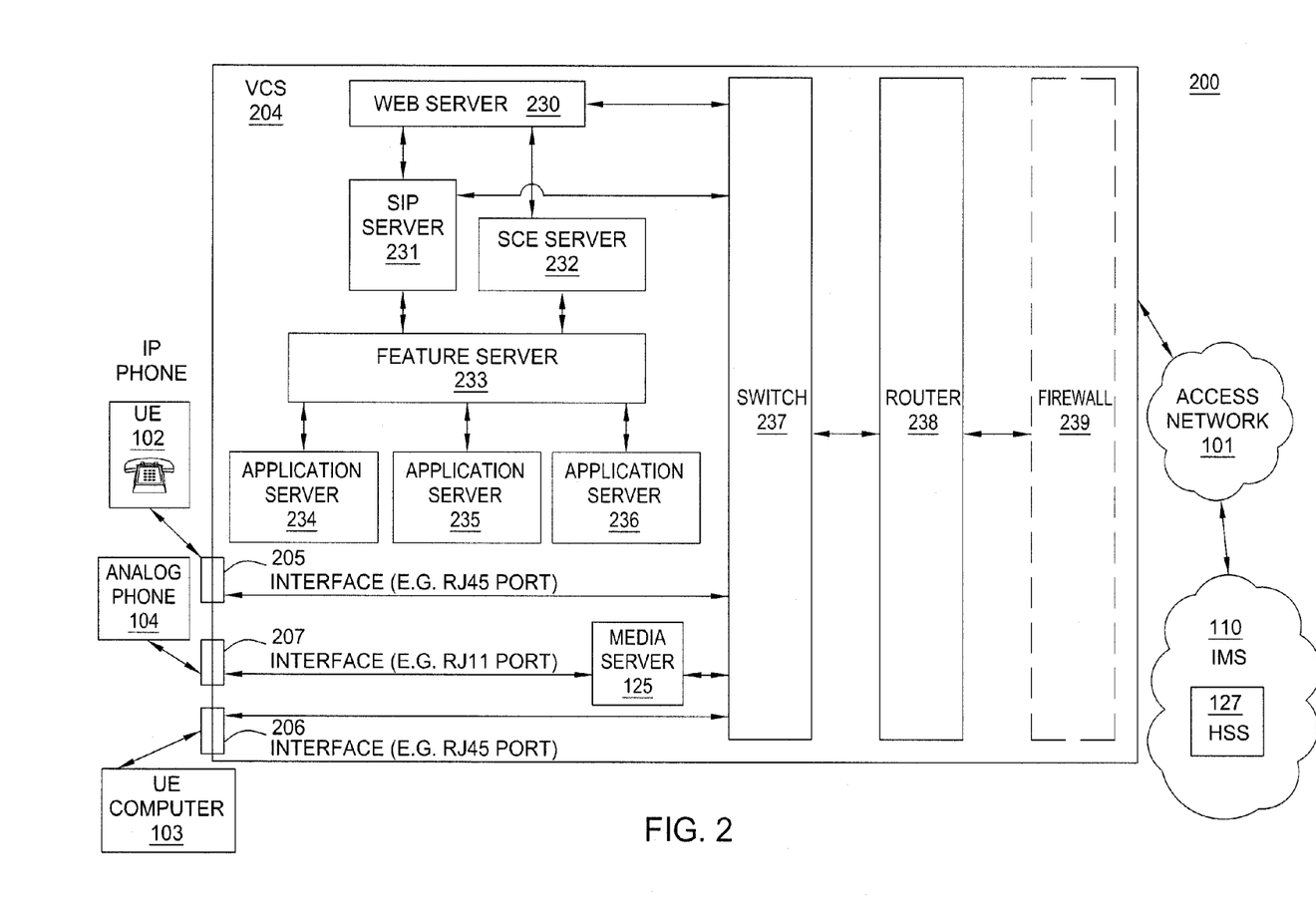
FIG. 2 illustrates an exemplary network in accordance with one embodiment of the current invention for providing a customer premise based feature in a network.

FIG. 2 illustrates an exemplary network 200 in accordance with one embodiment of the current invention for providing a customer premise based communication system for controlling and customizing service features for a phone, e.g., a Voice over Internet Protocol (VoIP) phone, and the like. In one embodiment, the network 200 comprises user endpoint (UE) devices 102, 103 and 104 communicating with an IMS network 110 via a VCS 204 and an access network 101. In one embodiment, the UE 102 is a device that may be used to initiate SIP phone calls, e.g., an IP phone. In one embodiment, the UE 103 may be a computing device, e.g., a computer, that may be used to interact with network devices (e.g., routers, application servers, etc.) located in the IMS 110. In one embodiment, the UE 104 is a device that may be used to initiate phone calls, e.g., an analog phone, via a media server 125. It should be noted that the customer premise based communication system and the user endpoint devices are located at a location that is local to the customer, e.g., a home or an office of the customer.

In one embodiment, the VoIP Central System (VCS) 204 comprises a web server 230, a SIP server 231, an SCE 232 server, a feature server 233, application servers 234-236, a switch 237, a router 238 and a firewall 239. The VCS 204 also comprises one or more RJ11 and RJ45 ports for enabling connection of user endpoint devices to the VCS. For example, the analog phone 104 is connected to the VCS 204 using a RJ 11 port 207. Additionally, the IP phone 102 is connected to the VCS 204 using a RJ 45 port 205 and the computer 103 is connected to the VCS 204 using a RJ45 port 206. The RJ45 port 205, RJ45 port 206, RJ11 port 207, SIP server 231 and web server 230 are connected to the switch 237. The switch 237, router 238 and firewall 239 are interconnected to enable the customer to access services from the IMS network 110. The application servers 234-236 may be used for enabling various customer created or modified features, e.g., call forwarding, call waiting, etc. It should be noted that the components illustrated in the VCS 204 are only exemplary. As such, additional components and fewer components can be implemented depending on the requirements of a particular application.

In one embodiment, when the customer subscribes to a service from the IMS network 110, the service provider assigns the customer a phone number (e.g., an E.164 number) and any other credentials required for activation. The service provider may also provide the customer with a VCS, e.g., VCS 204. The customer may then connect the VCS 204 to the IP phone 102 and computer 103. The customer may then register using the provided credentials and phone number.

In one embodiment, the customer may then access features provided by the service provider via the computer 103 and VCS 204. The customer is then empowered to activate and/or deactivate features as desired. For example, the customer may wish to customize some features that may be downloaded from the service provider's network. For example, the customer may be able to alter values of parameters for custom use and, in turn, deactivate usage of a similar feature currently provided by the service provider. For example, if the customer designs a customized call forwarding feature to suit the need of the customer, then the customer may store the custom designed call forwarding feature locally in the application server 234 and, in turn, deactivate the network based call forwarding feature that was being accessed from the network by communicating with an HSS 127 located in network 110.

In another example, the customer may create his/her features using the SCE server 232 and store the specific applications locally in the application servers 234-236.

In one embodiment, a service provider may also alter or deactivate a customer based service feature created or modified by a customer. In other words, a customer based service feature that was created or modified by a customer may impact a network of the service provider negatively and/or violate a governmental regulation. For example, a customer based service feature may create an endless calling loop (e.g., forwarding a call between two destinations endlessly) or may circumvent a monitoring feature specified by a governmental agency. If such customer based service feature is detected, the service provider may at its discretion, alter or deactivate the customer based service feature accordingly.

In one embodiment, the VCS may also comprise a module or a component in a module (e.g., an application server) for performing virtual testing of new or modified features, e.g., to determine whether the customer premise based feature is in compliance. For example, when a new feature is added, the new feature may conflict with a previous feature or a feature subscribed to from the service provider. The virtual testing may then be used to identify conflicts and perform remedies before committing a feature or a modification of a feature to implementation. For example, the new or modified feature may have unintended consequence if committed to implementation prior to testing. The customer may then wish to verify that the new or modified features will operate as intended and will also operate cohesively with other features. When the virtual testing is completed, the customer can then commit the feature or modification to implementation.

The customer may then access the customer premise based features using the SIP phone 102 or the computer 103. For example, the customer may initiate or receive calls with the customer premise based features. For example, if the SIP server 231 receives an incoming or an outgoing call, the SIP server 231 consults with the feature server 233 for instruction. In turn, the feature server 233 queries the applicable application servers 234-236, depending on the customer's preference for handling the call. The instructions obtained from the applicable application servers will then be sent to the SIP server 231 for use in handling the call.

Figure 3:
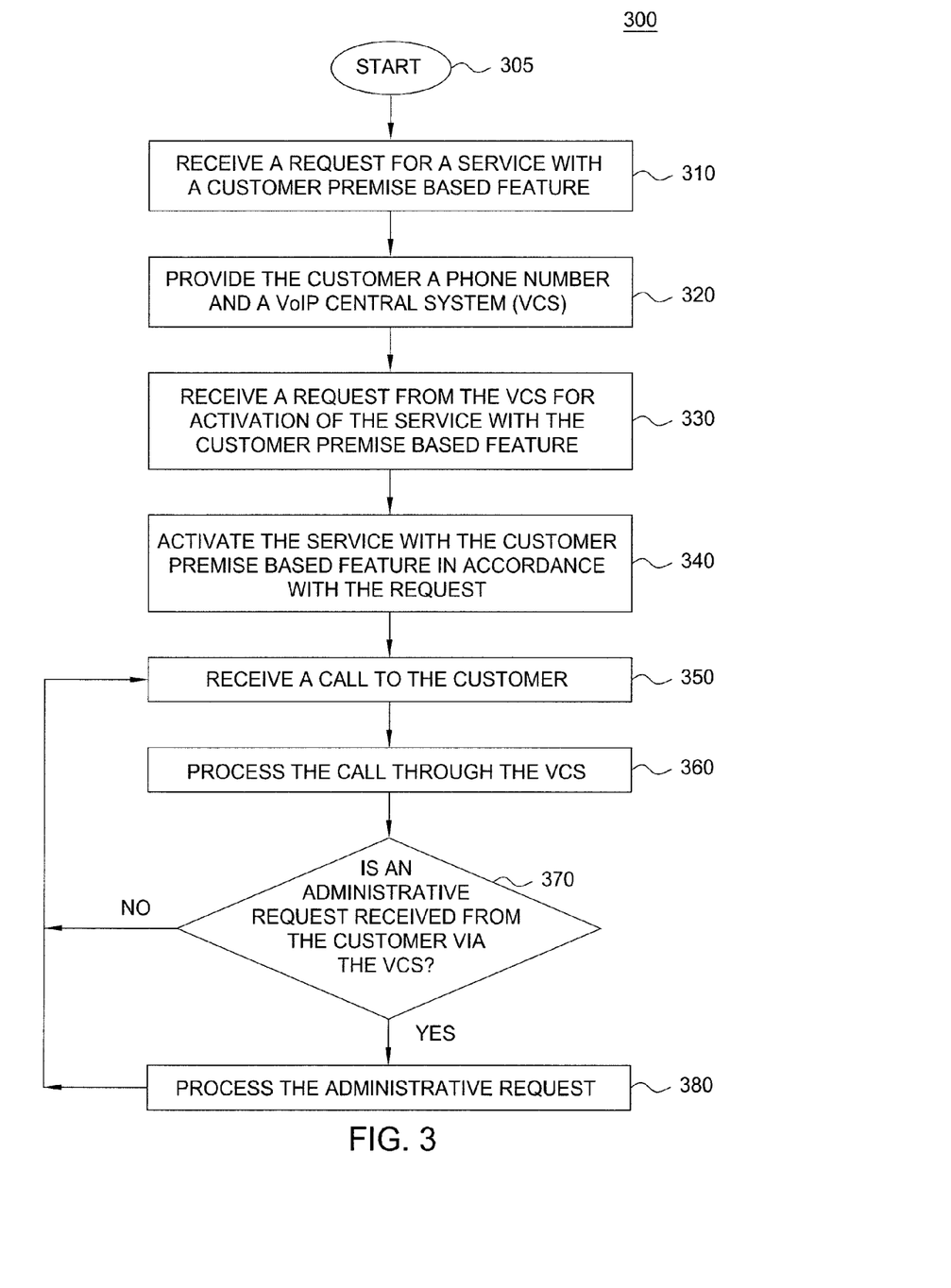
FIG. 3 illustrates a flowchart of a method for providing a customer premise based feature via a network.

FIG. 3 illustrates a flowchart of a method 300 for providing a customer premise based feature. For example, one or more steps of method 300 can be performed by a S-CSCF and/or an application server located in an IMS core network 110 as discussed above. Method 300 starts in step 305 and proceeds to step 310.

In step 310, method 300 receives a request for a service with a customer premise based feature. For example, a customer subscribes to a VoIP service and indicates a desire to control features locally from the customer premise.

In step 320, method 300 provides the customer with a phone number and a VoIP central System (VCS), wherein the VCS is a system that comprises a Session Initiation Protocol (SIP) server, a Service Creation Environment (SCE) server, and a web server. The service provider may also provide the customer credentials needed for service activation. For example, the service provider may assign the customer an E.164 phone number, a password, an identification, etc. and ship the VCS to the customer.

In step 330, method 300 receives a request from the VCS for activation of the service with the customer premise based feature. For example, the customer may logon to the service provider's network via the VCS, enter the assigned phone number and any credentials (if applicable), and request activation.

In step 340, method 300 activates the service with the customer premise based feature in accordance with the request. For example, the service provider will activate the service for the customer. The customer may then be able to initiate and receive calls via the VCS.

In step 350, method 300 receives a call to the customer, wherein the call is for a service with a customer premise based feature, i.e., broadly the call is associated with a customer premise based feature. For example, a SIP INVITE signaling message directed towards the customer may be received by a S-CSCF of the service provider.

In step 360, method 300 processes the call through a customer premise based communication system, e.g., the VoIP central System (VCS) located locally to the customer, e.g., located at the customer's premise to implement a customer premise based feature. For example, if a SIP INVITE signaling message directed towards the customer is received, the service provider will forward the SIP INVITE signaling message towards the VCS located at the customer premise. For example, the service provider may have records indicating that the customer has subscribed to a customer premise based feature service, e.g., by requesting a VCS. In doing so, the service provider will know that the VCS located at the customer premise will be able to handle and process any customer premise based features with the help of the VCS. As such, the service provider may simply forward the signaling message towards the VCS for service features that are supported locally by the VCS.

In step 370, method 300 determines if an administrative request is received from the customer via the VCS. For example, an administrative request may be for one or more of: a feature addition, a feature deletion, a feature modification and/or a virtual test. If an administrative request is received, the method proceeds to step 380. Otherwise, the method proceeds to step 350 to continue receiving calls.

In one embodiment, the administrative request may be to turn on or to turn off one or more pre-defined features, e.g., a network based service feature. For example, the customer may have added a customer premise based call forwarding feature. The customer may then wish to turn off a subscription to a call forwarding feature being provided from the service provider's network.

In one embodiment, the administrative request may be to download one or more customizable features. For example, the customer may wish to download a customizable feature, thereby allowing the customer to customize the feature accordingly, e.g., by selecting values for one or more parameters. The customized feature may then be implemented and stored locally in the VCS. That is, the customized feature may be added to the customer premise based features stored in the VCS.

In one embodiment, the administrative request may be to perform a virtual test for a new or modified feature. For example, after building a new feature or modifying an existing feature in the VCS, the customer may wish to determine if there are any unintended results and/or conflicts with other features if the newly built or modified feature is implemented. The customer may then make an administrative request to perform a virtual test for the new or modified feature prior to committing the feature to implementation, via the VCS.

In step 380, method 300 processes the administrative request. For example, if the request is to cancel a network based call forwarding feature, the method cancels the network based call forwarding feature. For example, the customer may have built a customized call forwarding feature in the VCS. The customer may then utilize the customized call forwarding feature locally from the VCS. The method then proceeds to step 350 to continue receiving calls.

It should be noted that steps 370 and 380 can be deemed as optional steps. Furthermore, steps 370 and 380 are not intended to be executed for each instance that a call is received from the customer or is directed toward the customer. These steps are illustrated in FIG. 3 to show that a customer may forward an administrative request to the service provider.

Figure 4:
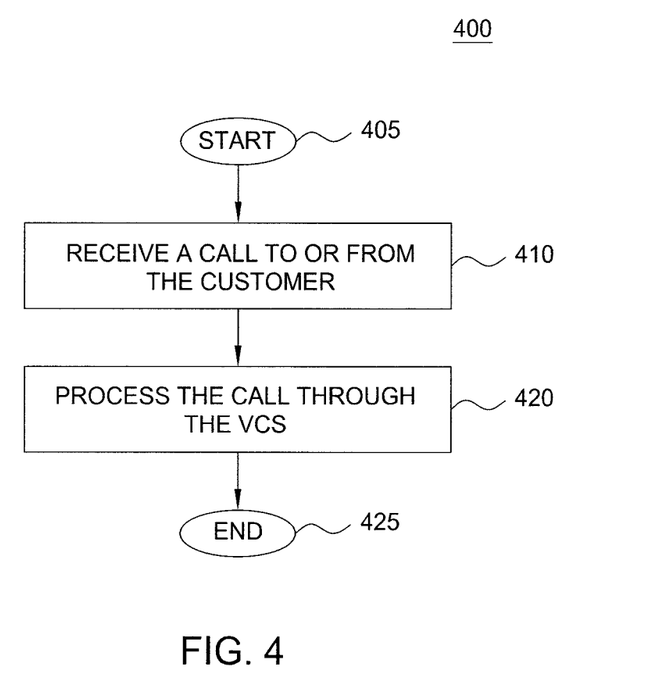
FIG. 4 illustrates a flowchart of a method for providing a customer premise based feature via a customer premise based communication system.

FIG. 4 illustrates a flowchart of a method 400 for providing a customer premise based feature via a customer premise based communication system. In one embodiment, the customer premise based communication system comprises a VoIP Central System (VCS) as discussed above. Method 400 starts in step 405 and proceeds to step 410.

In step 410, method 400 receives a call to or from the customer, wherein the call is for a service with a customer premise based feature. For example, a signaling message is directed towards the customer premise based communication system from a user endpoint 102 or 103, e.g., the customer is making an outbound call using one of the user endpoints. Alternatively, the signaling message is directed towards the customer premise based communication system from a network element of the IMS core network, e.g., the customer is receiving an inbound call directed towards one of the user endpoints.

In step 420, method 400 processes the call through the customer premise based communication system, e.g., the VoIP central System (VCS) located locally to the customer, e.g., located at the customer's premise to implement a customer premise based feature. For example, if a signaling message directed towards the customer is received, the customer premise based communication system may process the received signaling message in accordance with a customized feature that is maintained and implemented locally by the customer premise based communication system. Namely, the service feature logic associated with the customer premise based feature is maintained locally by the customer premise based communication system.

For example, if the signaling message is intended to setup a call to a customer's endpoint device, but the signaling message is received during a time that has been specified by the customer as being after hour, then the customer premise based communication system may process the received signal message in accordance with an after hour preference or feature that is locally customized by the customer, e.g., sending the call to a voicemail system, sending the call to a mobile cell phone number, playing a pre-recorded message to the caller, terminating the call, playing a ringing tone to the caller without forwarding the call to the customer's endpoint device, and so on.

Alternatively, if a signaling message directed towards the IMS core network is received, the customer premise based communication system may process the received signaling message in accordance with a customized feature that is maintained and implemented locally by the customer premise based communication system. For example, if the signaling message is intended to setup a call to a called party specified by a customer and the customer wants to disguise his or her identity, then the customer premise based communication system may process the received signal message in accordance with a disguise identify preference or feature that is locally customized by the customer, e.g., sending the call setup signaling message to a network element of the IMS network without an identification of the customer, with a pseudo identification specified by the customer, with an instruction to the S-CSCF to omit the customer's identification, sending an arbitrarily chosen name, and so on. Once the customer premise based feature has been implemented, e.g., the associated feature logic has been retrieved and executed, then the call can be completed accordingly and method 400 ends in step 425.

It should be noted that although not specifically specified, one or more steps of methods 300 and 400 may include a storing, displaying and/or outputting step as required for a particular application. In other words, any data, records, fields, and/or intermediate results discussed in the method can be stored, displayed and/or outputted to another device as required for a particular application. Furthermore, steps or blocks in FIG. 3 and FIG. 4 that recite a determining operation or involve a decision, do not necessarily require that both branches of the determining operation be practiced. In other words, one of the branches of the determining operation can be deemed as an optional step.

Figure 5:
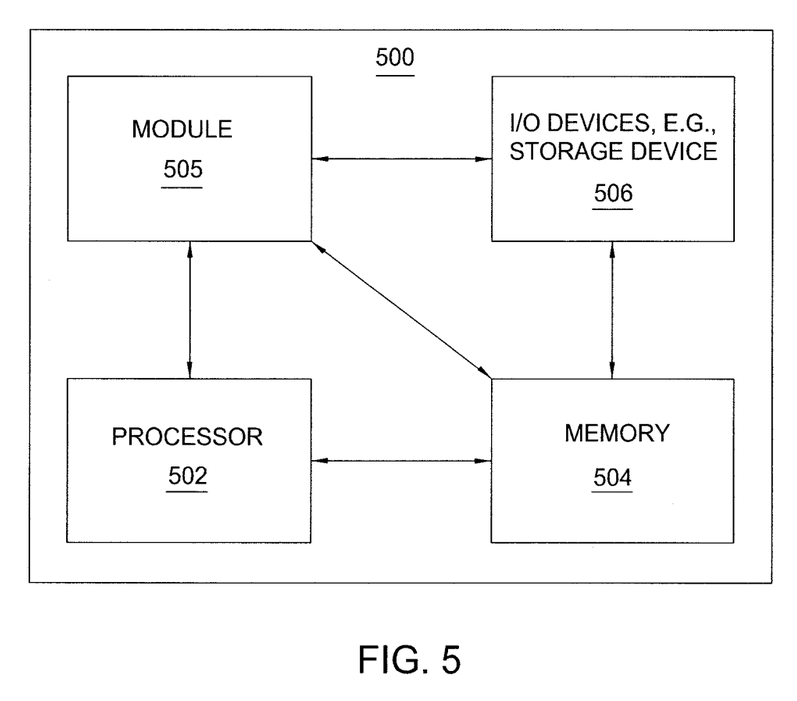
FIG. 5 illustrates a high-level block diagram of a general-purpose computer suitable for use in performing the functions described herein.

FIG. 5 depicts a high-level block diagram of a general-purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for providing a customer premise based feature in a network, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 505 for providing a customer premise based feature in a network can be loaded into memory 504 and executed by processor 502 to implement the functions as discussed above. As such, the present method 505 for providing a customer premise based feature as discussed above in FIG. 3 and FIG. 4 (including associated data structures) of the present invention can be stored on a computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing a customer premises based feature, comprising:
   receiving, by a processor, a call directed to a customer, wherein the call is associated with the customer premises based feature;
   forwarding, by the processor, the call to a customer premises based communication system located at a location of the customer, wherein the customer premises based feature is implemented locally by the customer premises based communication system; and
   receiving, by the processor, an administrative request from the customer premises based communication system, wherein the administrative request comprises a request to turn off a network based service feature corresponding to the customer premises based feature.

2. The method of claim 1, wherein the customer premises based communication system comprises a session initiation protocol server.

3. The method of claim 1, wherein the customer premises based communication system comprises a switch.

4. The method of claim 1, wherein a service feature logic associated with the customer premises based feature is maintained locally by the customer premises based communication system.

5. The method of claim 1, wherein the administrative request further comprises a request to turn on another network based service feature.

6. The method of claim 1, wherein the customer premises based feature has been customized by the customer.

7. A method for providing a customer premises based feature, comprising:
   receiving, by a processor of a customer premises based communication system, a call, wherein the call is associated with the customer premises based feature, wherein the call is received by the customer premises based communication system located at a location of the customer;
   implementing, by the processor, the customer premises based feature locally by the customer premises based communication system; and
   sending, by the processor, an administrative request from the customer premises based communication system to a network element, wherein the administrative request comprises a request to turn off a network based service feature corresponding to the customer premises based feature.

8. The method of claim 7, wherein the customer premises based communication system comprises a session initiation protocol server.

9. The method of claim 7, wherein the customer premises based communication system comprises a switch.

10. The method of claim 7, wherein a service feature logic associated with the customer premises based feature is maintained locally by the customer premises based communication system.

11. The method of claim 7, wherein the administrative request further comprises a request to turn on another network based service feature.

12. The method of claim 7, wherein the customer premises based communication system further comprises:
   a module for performing a test to determine the customer premises based feature is in compliance.

13. A customer premises based communication system for providing a customer premises based feature, comprising:
   a processor; and
   a non-transitory computer readable medium storing a plurality of instructions which, when executed by the processor, cause the processor to perform operations, the operations comprising:
      receiving a call, wherein the call is associated with the customer premises based feature, wherein the call is received by the customer premises based communication system located at a location of the customer;
      implementing the customer premises based feature locally by the customer premises based communication system; and
      sending an administrative request from the customer premises based communication system to a network element, wherein the administrative request comprises a request to turn off a network based service feature corresponding to the customer premises based feature.

14. The customer premises based communication system of claim 13, wherein the customer premises based communication system comprises a session initiation protocol server.

15. The customer premises based communication system of claim 13, wherein the customer premises based communication system comprises a switch.

16. The customer premises based communication system of claim 13, wherein a service feature logic associated with the customer premises based feature is maintained locally by the customer premises based communication system.

17. The customer premises based communication system of claim 13, wherein the administrative request further comprises a request to turn on another network based service feature.

18. The customer premises based communication system of claim 13, further comprising:
   performing a test to determine the customer premises based feature is in compliance.

* * * * *